(12) United States Patent
Horn et al.

(10) Patent No.: US 6,726,216 B2
(45) Date of Patent: Apr. 27, 2004

(54) PISTON RING WITH OXIDE-NITRIDE COMPOSITE LAYER

(75) Inventors: Ehrenfried Horn, Dasing (DE); Rudolf Widmann, Kuhbach (DE); Steffen Hoppe, Huelsenpfad (DE)

(73) Assignee: Federal-Mogul Friedberg GmbH, Friedberg (DE)

( * ) Notice: Subject to any disclaimer, the term of this patent is extended or adjusted under 35 U.S.C. 154(b) by 0 days.

(21) Appl. No.: 10/158,836

(22) Filed: Jun. 3, 2002

(65) Prior Publication Data

US 2002/0180157 A1 Dec. 5, 2002

(30) Foreign Application Priority Data

Jun. 1, 2001 (DE) .......................... 101 27 020

(51) Int. Cl.$^7$ ................ F02F 5/00; F16J 9/00; F16J 9/26
(52) U.S. Cl. .............. 277/434; 277/440; 277/443; 277/444
(58) Field of Search ................ 277/440, 442, 277/443, 456, FOR 101, 444

(56) References Cited

U.S. PATENT DOCUMENTS

| | | | | |
|---|---|---|---|---|
| 3,988,119 A | * | 10/1976 | Takahashi et al. | 277/442 |
| 4,359,230 A | * | 11/1982 | Bruni | 277/444 |
| 4,579,355 A | * | 4/1986 | Koorooki | 277/443 |
| 5,773,735 A | * | 6/1998 | Dubensky et al. | 75/240 |

FOREIGN PATENT DOCUMENTS

| | | | | |
|---|---|---|---|---|
| DE | 2715745 | | 10/1977 | |
| DE | 3225686 | | 12/1984 | |
| DE | 3502143 | | 3/1988 | |
| EP | 759519 A2 | * | 2/1997 | F16J/9/26 |
| EP | 1061153 A1 | * | 12/2000 | C23C/4/10 |
| JP | 58027862 A | * | 2/1983 | F02F/5/00 |
| JP | 60150462 A | * | 8/1985 | F02F/5/00 |
| JP | 61096263 A | * | 5/1986 | F16J/9/26 |

OTHER PUBLICATIONS

Kerspe, J.H. et al., "Aufgaben und Verfahren in der Oberflaechenbehandlung", Kontakt & Studium, Band. 588, 2000, pp. 147–163.

* cited by examiner

Primary Examiner—Anthony Knight
Assistant Examiner—Vishal Patel
(74) Attorney, Agent, or Firm—Marina V. Schneller; Venable, LLP

(57) ABSTRACT

A piston ring for use in a cylinder of an internal combustion engine, which ring is nitride-hardened at least on the sliding surface between piston ring and cylinder wall. The nitride layer is composed of a precipitated layer and a compound layer, wherein the piston ring consists of a low-alloyed iron-base material and an oxide layer is deposited on the compound layer.

4 Claims, No Drawings

PISTON RING WITH OXIDE-NITRIDE COMPOSITE LAYER

CROSS REFERENCE TO RELATED APPLICATION

This application claims the benefit of priority of German application No. 10127020.8 filed on Jun. 1, 2001, which is relied upon and expressly incorporated by reference herein.

FIELD OF THE INVENTION

The invention relates to a piston ring for use in a cylinder of an internal combustion engine. This piston ring is nitride-hardened at least on the sliding surface between piston ring and cylinder wall, wherein the nitride layer consists of a precipitated layer and a composite layer.

BACKGROUND OF THE INVENTION

Among the thermo-chemical treatment methods, nitration or nitro-carburization (or carbonization) has long been used worldwide for structural components. Those thermochemical treatment methods provide improvement in the characteristics of the surface-layer with respect to wear resistance, corrosion resistance and endurance limit. In the field of automobile technology, these methods are mainly used for structural components subjected to high sliding stresses, e.g. for spur gears, gear shafts or piston rings.

During the nitriding, carbide and/or carbide/nitride modification, the carbon or nitrogen penetrates the surface of the components and interacts with the dislocations, thus leading to a change in the material characteristics. The dissolved, as well as the precipitated, nitrogen or carbon increase the hardness. Generally the higher the share of nitride-forming alloy elements in the component, the higher the hardness. Nitride layers can basically be divided into two layer regions, including a first diffusion layer and a second compound layer. For this, a porous rigid area develops in the outer region of the composite layer surface, which can negatively influence the operational behavior of the components stressed by sliding friction. With respect to the piston ring, this can lead to micro welding at the surface, to increased piston groove wear and to the formation of furrows on the cylinder wall.

German reference DE 35, 02, 143 C2 therefore proposes a piston-ring coating, in which a rigid composite layer is removed; and an oxide layer that positively influences the running-in behavior is additionally deposited onto the diffusion layer. The oxide layer in this case is soft enough, so that it can adapt easily to the cylinder wall at the start of operations, thus preventing the negative running-in phenomena that otherwise occur at the start. In addition, oxide layers have a good corrosion resistance. The claims for reference DE 35, 02, 143 C2 relate to a nitride-hardened high-alloyed steel, but do not take into account the fact that the nitride-hardening of high-alloyed steel negatively effects the corrosion resistance. The deposited composite layer is subsequently removed again, meaning that an additional operational step is required, and the rigid supporting layer on the piston ring is removed.

Reference DD 119, 822 describes depositing an oxide layer onto a nitride-hardened iron alloy to improve the corrosion resistance and, simultaneously, provide the surface with a decorative appearance, as well as create favorable conditions for accepting lubricants. In general, this reference deals with iron and iron alloys, in particular used for chip-removing tools, which are nitride-hardened and are subsequently oxidized in an oxygen-containing medium. Thus, an approximately 5 $\mu$m thick oxidized cover layer is formed, which is advantageous for chip-removing tools. These 5 $\mu$m thick cover layers, however, are unsuitable for components that are subjected to sliding friction since cracks can form in these layers. It is advantageous in this case if single-phase, oxidized cover layers with $Fe_3O_4$ are primarily formed. Even the composite layers are formed as single-phase layers, for example as $Fe_{2-3}N$ layers. However, formation of multi-phase oxidized cover layers or composite layers is not suggested in and does not follow from this reference.

Reference DE 195, 25, 182 C2 provides a general description of a method for creating corrosion-resistant layers and wear-resistant layers on materials with an iron base. With this method, areas close to the surface are enriched with nitrogen, carbon and oxygen. The process steps described therein include the steps of nitro-carburizing the material with iron base to form a compound layer consisting of iron carbo-nitrides (carbide/nitrides), of activating the surface of the material in a plasma-supported vacuum pressure process and of oxidizing the material to form a closed oxide layer. The references does not relate to using this method for components in internal combustion engines, in particular having low-alloyed piston rings.

SUMMARY OF THE INVENTION

Thus, it is the object of the invention to modify the above-described prior art and to develop a piston ring, which exhibits improved performance during its use, and the improved corrosion resistance and minimizing the wear on the piston-ring surface as well as in the piston ring groove.

This object is solved according to the invention by a piston ring for use in a cylinder of an internal combustion engine. The piston ring of the invention has a surface that is in sliding contact relationship with a wall of said cylinder during operation, and comprise a piston ring which comprises iron or an iron alloy;

an oxide layer which is deposited on the outer surface of said piston ring and which is deposited over a compound layer, and which oxide layer, during operation is in sliding contact with said cylinder; and a region of increased nitride content between said oxide layer and said iron or iron alloy dispose whereby the piston ring is nitride-hardened, wherein the nitride layer comprises a precipitated layer and a compound layer, where said oxide layer is deposited over said compound layer.

DETAILED DESCRIPTION

The invention comprises a piston ring consisting of a low-alloyed iron-base material and an oxide layer which is deposited on the compound layer. The nitration (nitriding) processes used to create the precipitated layer and the compound layer include the gas ambient pressure process and the plasma vacuum pressure process. A precipitated layer is thus formed in the low-alloyed material, which consists of one or both of the elements nitrogen and carbon and is present in the layer as $Fe_4N$ and/or special nitrides.

A multi-phase, wear-resistant compound layer is deposited over the precipitation layer, wherein the thickness of the compound layer can be between 30 $\mu$m and 1000 $\mu$m. A layer thickness of 200–500 $\mu$m has proven advantageous during experiments. As a result of introducing nitrogen and carbon into the material, a multi-phase compound layer that contains the elements as iron nitrides or iron carbo-nitrides forms on the material. It is advantageous if the elements are present in the form of $Fe_{2-3}N$ and/or $Fe_{2-3}NC$ and/or $Fe_4N$ and/or $Fe_4NC$ and/or as special nitride or special carbo-nitride, for example provided as CrN or CrCN. The compound layer in one embodiment consists exclusively of iron nitrides while the layer in another embodiment consists of iron carbide-nitrides and/or special carbo-nitrides and/or special nitrides.

The piston rings are provided with an oxide layer as outer layer that positively influences the operational behavior. The oxide layer, which has a thickness of 1–4 μm is formed with iron oxides, in which the iron is in the 2 or 3 valence state, and is one of hematite and magnetite. The running-in behavior is improved considerably by the presence of the oxide layer on the piston ring. The oxide layer thus leads to a reduction in the friction coefficient and consequently functions so-to-speak as sliding means during the running-in phase. The hard nitrides thus cannot damage the surfaces of the sliding components, for example the cylinder liner, the piston ring groove or the spring on the internal peripheral surface of the piston ring. Another essential advantage of the multi-phase oxide layer is the clear increase in the resistance of the material against corrosive media, such as chlorides, sulfides and acids.

What is claimed is:

1. A nitride hardened piston ring for use in a cylinder of an internal combustion engine, which piston ring has a surface that is in sliding contact relationship with a wall of said cylinder during operation, wherein the piston ring comprises low alloy iron based material;

a region of increased nitride content whereby the piston ring is nitride-hardened, wherein said region of increased nitride content comprises a precipitated layer and a compound layer, wherein the compound layer comprises a multi-phase compound layer; and wherein the precipitated layer comprises ferrite and further comprises dissolved nitrogen or carbon and which are in the precipitated layer in the form of $Fe_4N$ member selected from the group consisting of Fe4N, CrN and CrCN;

an oxide layer which is deposited on the said surface of said piston ring and which is deposited over the compound layer, and which oxide layer, during operation is in sliding contact with said cylinder wherein the oxide layer has a thickness of 1–4 μm and wherein the oxide layer comprises at least one iron oxide in which the iron has a valence of 2 or 3 and the iron oxide is in the form of hematite and magnetite.

2. The piston ring of claim 1, wherein the compound layer is a multiphase compound layer, selected from the group consisting of $Fe_{2-3}N$, Fe2-3NC, Fe4N, Fe4NC, CrN and CrCN.

3. The piston ring of claim 1, wherein the nitration-hardened layer is generated with a gas-normal pressure technique.

4. The piston ring of claim 2, wherein the nitration-hardened layer is generated with a gas-normal pressure technique.

* * * * *